(12) United States Patent
Kawamoto

(10) Patent No.: US 8,934,162 B2
(45) Date of Patent: Jan. 13, 2015

(54) DIAPHRAGM DEVICE

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 111 days.

(21) Appl. No.: 13/419,780

(22) Filed: Mar. 14, 2012

(65) Prior Publication Data

US 2012/0170096 A1 Jul. 5, 2012

Related U.S. Application Data

(63) Continuation of application No. PCT/JP2010/065043, filed on Sep. 2, 2010.

(30) Foreign Application Priority Data

Nov. 20, 2009 (JP) ................................ 2009-264949

(51) Int. Cl.
G02B 26/02 (2006.01)
G03B 9/06 (2006.01)

(52) U.S. Cl.
CPC ........................................ *G03B 9/06* (2013.01)
USPC .......................................................... 359/230

(58) Field of Classification Search
USPC ......................................... 359/227, 230–236
See application file for complete search history.

(56) References Cited

U.S. PATENT DOCUMENTS

| 2003/0175023 | A1 | 9/2003 | Suh | |
|---|---|---|---|---|
| 2004/0218246 | A1* | 11/2004 | Onuki et al. | ................... 359/234 |
| 2010/0011893 | A1 | 1/2010 | Kawamoto | |

FOREIGN PATENT DOCUMENTS

| CN | 1447181 | 10/2003 |
|---|---|---|
| CN | 1645235 | 7/2005 |
| EP | 1560066 | 8/2005 |
| JP | 2003-195389 A1 | 7/2003 |
| JP | 2005-275177 A1 | 10/2005 |
| JP | 2009-133440 A1 | 6/2009 |

OTHER PUBLICATIONS

International Search Report for International Application No. PCT/JP2010/065043 dated Oct. 5, 2010.
First Notification of Office Action issued Jan. 24, 2014 by the State Intellectual Property Office of China in counterpart application No. 201080046888.2 with English translation.
Chinese Office Action dated Sep. 5, 2014 in the corresponding Chinese patent application No. 201080046888.2, with English translation.

* cited by examiner

*Primary Examiner* — Jennifer L. Doak
(74) *Attorney, Agent, or Firm* — Kratz, Quintos & Hanson, LLP

(57) ABSTRACT

A diaphragm device includes: a board including an opening; a step motor including a teeth portion, and rotatable and stoppable at an interval of a predetermined step angle; a transmitting member including a driven teeth portion meshing the teeth portion, and capable of rotating and stopping in response to a drive force of the teeth portion; a drive ring capable of rotating and stopping in response to a drive force of the transmitting member; and a blade capable of stopping at a receding position to recede from the opening or at an aperture position to cover at least a part of the opening, in response to a drive force of the drive ring.

8 Claims, 6 Drawing Sheets

DIAPHRAGM DEVICE

CROSS-REFERENCE TO RELATED APPLICATION

This application is a continuation of and claims priority to International Patent Application No. PCT/JP2010/065043 filed on Sep. 2, 2010, which claims priority to Japanese Patent Application No. 2009-264949 filed on Nov. 20, 2009, subject matter of these patent documents is incorporated by reference herein in its entirety.

BACKGROUND (i) Technical Field

The present invention relates to diaphragm devices.

(ii) Related Art

Japanese Unexamined Patent Application Publication No. 2005-275177 discloses a diaphragm device in which plural blades reduce an aperture diameter of an opening formed in a board. A drive force is transmitted from a step motor to the blades through a drive ring. The drive force is transmitted from the step motor to the drive ring through a teeth portion formed in the drive ring or a gear. The drive force is transmitted from the drive ring to the blades by engaging drive pins of the drive ring with cam slots formed in the blades.

A rotor of the step motor used for the diaphragm device is capable of stopping at given step angle intervals. The plural positions where the rotor is capable of stopping are set. The rotor stops, and then the drive ring and the blades stop. The aperture diameter of the opening is defined based on the stop positions of the blades.

Generally, the drive force of the rotor is transmitted to the drive ring through a gear or the like. Thus, there is a linear relationship between the rotational angle of the rotor and the rotational angle of the drive ring. Therefore, since the intervals between the adjacent positions where the rotor is capable of stopping are constant, the intervals between the adjacent positions where the drive ring is capable of stopping are also constant.

On the other hand, an interval between the adjacent stop positions of the blade in response to the stop of the rotor is set to be smaller as the aperture diameter of the opening is reduced. This is achieved, because the drive ring moves such that its drive pin is more spaced apart from a rotational center of the blade as the aperture diameter of the opening is reduced. This is because the rotational angle of the blade about the rotational center becomes smaller than a given rotational angle of the drive pin, as the distance between the rotational center of the blade and the drive pin is larger.

When the drive ring stops at a position misaligned from the original stoppable position, the blade also stops at a position misaligned from the original stop position. This influences the aperture diameter of the opening. In particular, the stop position is misaligned in such a way in the minimum aperture state where the aperture diameter of the opening is minimum, so that the accuracy of the aperture diameter of the opening is significantly influenced. In order to make the influence on the accuracy of the aperture diameter of the opening as less as possible, it is preferable that the intervals between the stoppable positions of the drive ring should be set as large as possible and the distance between the rotational center of the blade and the drive pin of the drive ring should be set as large as possible in the minimum aperture state. With the above setting, the interval between the adjacent stoppable positions of the blade is minimum in the minimum aperture state, relative to the interval between the adjacent stoppable positions of the drive ring. Thus, even when the drive ring is misaligned from the stop position in the minimum aperture state, the stop position of the blade is less influenced.

Herein, the intervals between the stop positions of the drive ring are constant in the whole movable range of the drive ring. This is because, as mentioned above, the step motor stops at constant intervals, and the drive force is transmitted to the drive ring through a gear from the step motor in a general manner. Thus, if the intervals between the stoppable positions of the drive ring are set as large as possible, the whole movable range of the drive ring is made large, so the whole movable range of the drive pin is made large. In accordance with this, the size of the cam slot engaging the drive pin has to be increased. This increases the size of the blade.

As mentioned above, if the accuracy of the stop position of the blade is maintained in the minimum aperture state where the aperture diameter of the opening is minimum, the movable range of the drive ring is increased, so the size of the blade is increased.

SUMMARY

It is therefore an object of the present invention to provide a diaphragm device that reduces a size of a blade with the accuracy of a stop position of the blade maintained in the minimum aperture state where an aperture diameter of an opening is minimum.

According to an aspect of the present invention, there is provided a diaphragm device including: a board including an opening; a step motor including a teeth portion, and rotatable and stoppable at an interval of a predetermined step angle; a transmitting member including a driven teeth portion meshing the teeth portion, and capable of rotating and stopping in response to a drive force of the teeth portion; a drive ring capable of rotating and stopping in response to a drive force of the transmitting member; and a blade capable of stopping at a receding position to recede from the opening or at an aperture position to cover at least a part of the opening, in response to a drive force of the drive ring, wherein the drive ring includes a drive pin engaging the blade, and a driven pin, the transmitting member includes a cam slot engaging the driven pin, and a relationship between a rotational amount of the transmitting member and a rotational amount of the drive ring is nonlinear.

DETAILED DESCRIPTION

Figure 1:
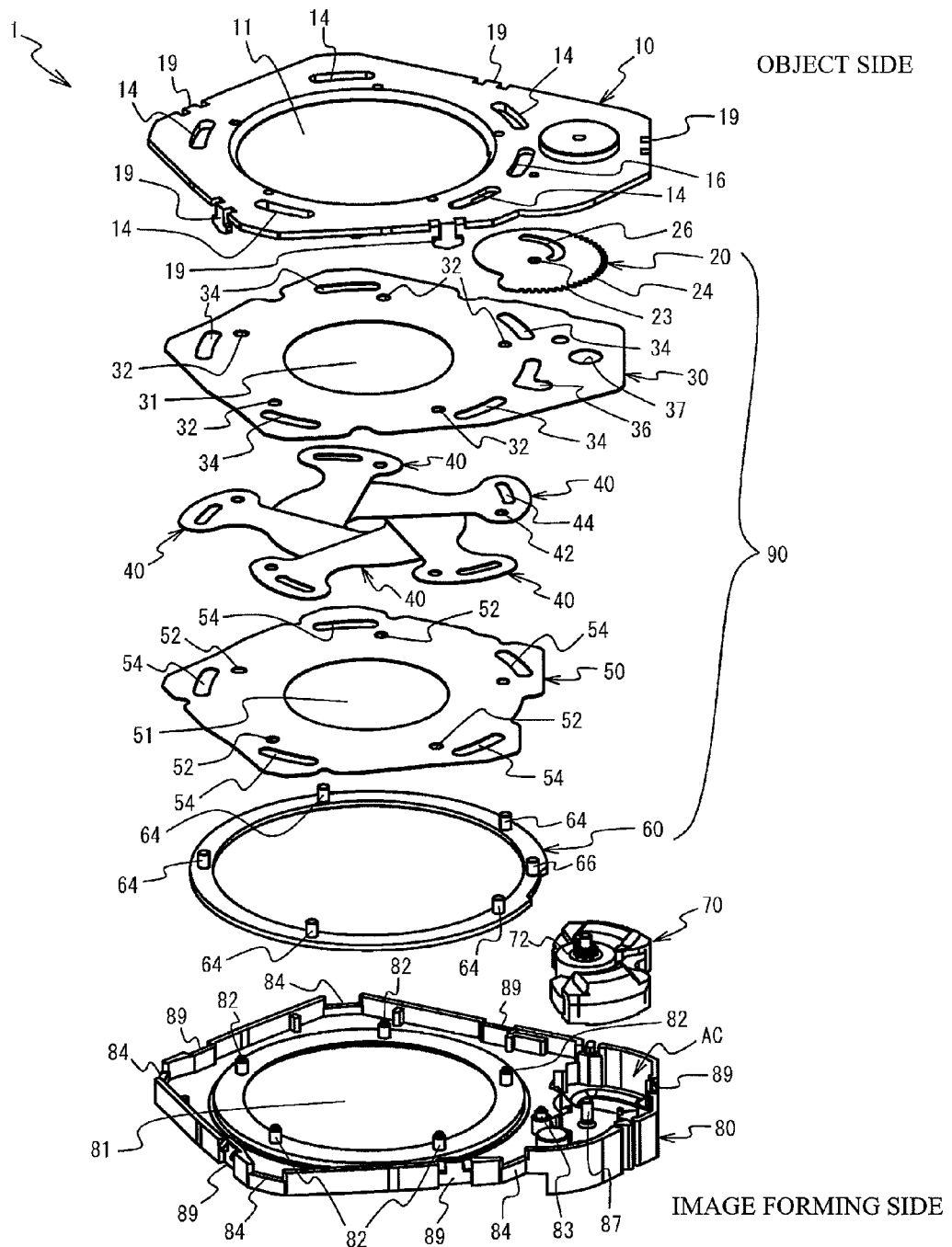
FIG. 1 is an exploded perspective view of a diaphragm device according to an embodiment.

In the following, a description will be given of a diaphragm device 1 with reference to the drawings. FIG. 1 is an exploded perspective view of the diaphragm device 1 according to the embodiment. The diaphragm device 1 according to the embodiment of the present invention includes a shutter board 10, a transmitting member 20, a thin plate 30, five blades 40, a thin plate 50, a drive ring 60, a step motor 70, and a shutter board 80, which are arranged in this order from the object side to the image-forming side, when the object side is in the upper side of the drawing and the image-forming side is in the lower side of the drawing. When the diaphragm device 1 according to the embodiment of the present invention is employed in a camera (optical device), an image pickup element (not illustrated) for imaging an object image is arranged at an image-forming side.

The transmitting member 20, the thin plate 30, the blades 40, the thin plate 50, the drive ring 60, and the step motor 70 are housed between the shutter boards 10 and 80. The shutter board 10, the thin plates 30 and 50, and the shutter board 80 are respectively formed with openings 11, 31, 51, and 81, for defining the optical path, at their centers. Additionally, each of the openings 31 and 51 is smaller than each of the openings 11 and 81. The drive force of the step motor 70 is transmitted to the plural blades 40 via the transmitting member 20 and the drive ring 60. They will be described later in detail. Also, the transmitting member 20 and the drive ring 60 serving as a driven member are included in a speed reducing mechanism 90. The speed reducing mechanism 90 is provided between the shutter boards 10 and 80.

When the drive force is transmitted to the blades 40, the plural blades 40 swing about given positions. The apertures of the openings 11, 31, 51, and 81 are thus adjusted. The adjustment of the aperture enables the amount of object light entering an image pickup element to be adjusted. Further, the thin plate 30 is arranged between the transmitting member 20 and the blades 40, and the thin plate 50 is arranged between the blades 40 and the drive ring 60. The thin plates 30 and 50 are arranged between drive parts in order to avoid the interference of the thin plate 30 with the thin plate 50. Each of the thin plates 30 and 50 has a sheet shape.

Figure 2:
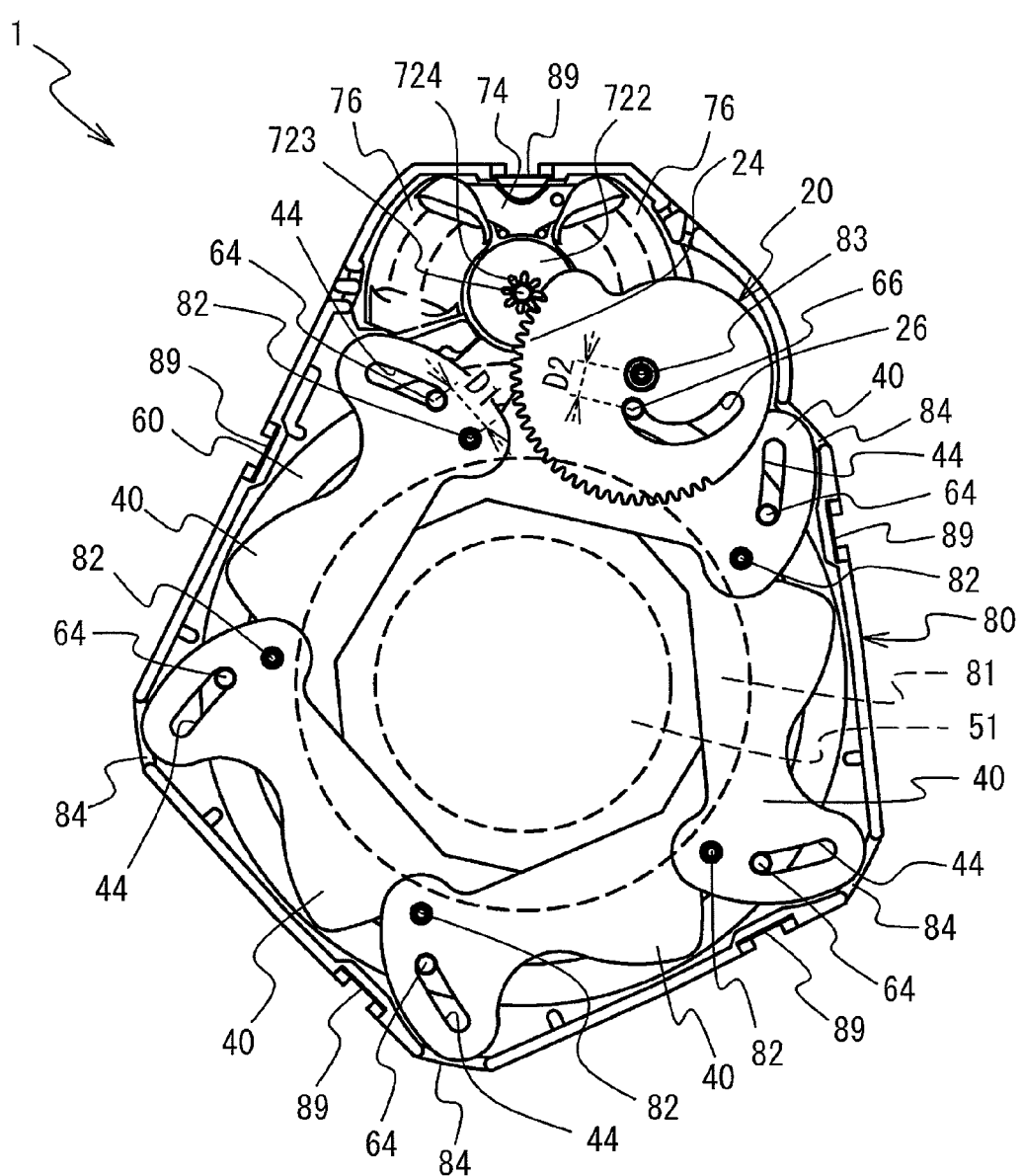
FIG. 2 is a front view of an internal structure of the diaphragm device, according to the embodiment, which has been assembled.
Figure 3:
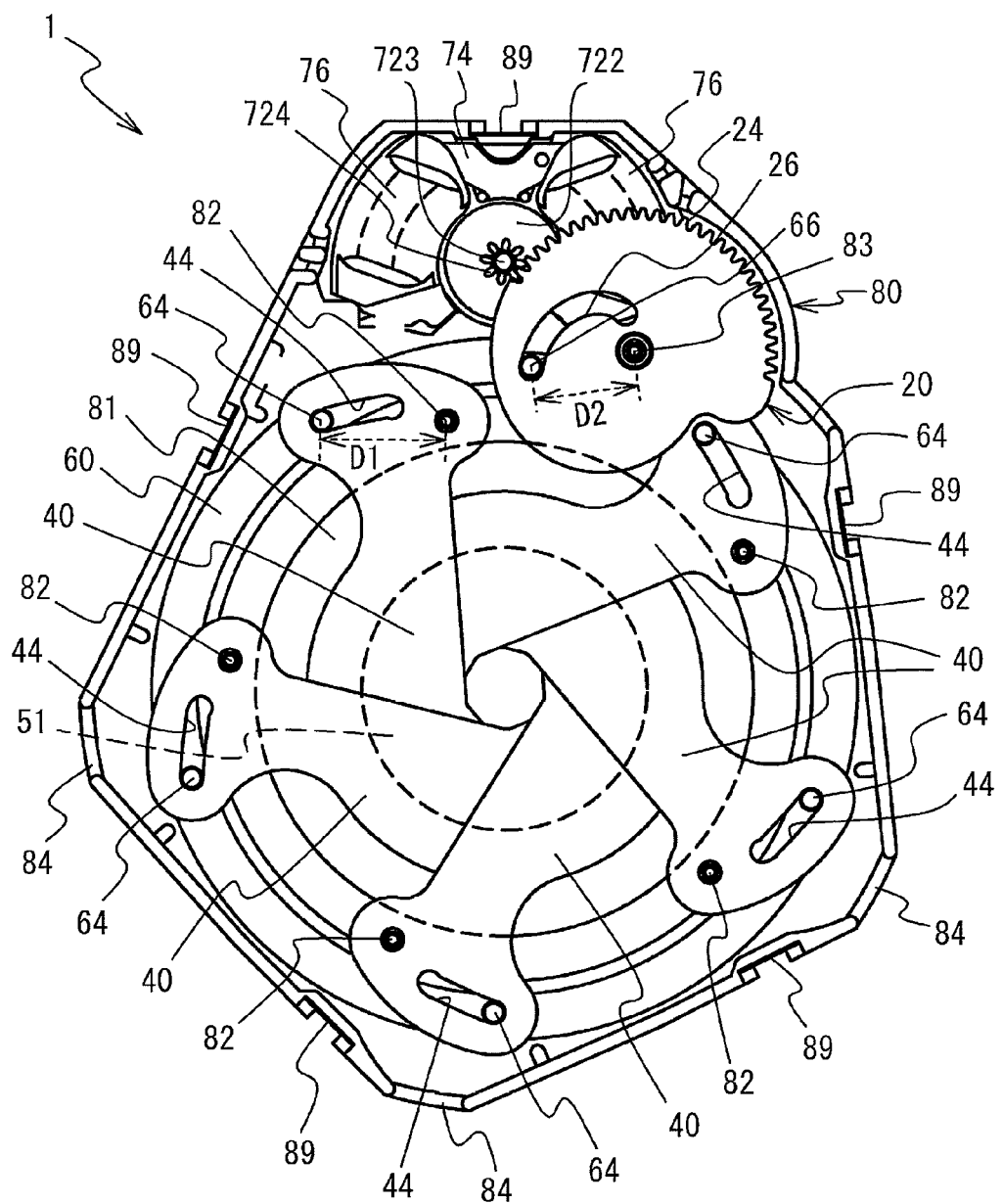
FIG. 3 is a front view of an internal structure of the diaphragm device, according to the embodiment, which has been assembled.
Figure 4:
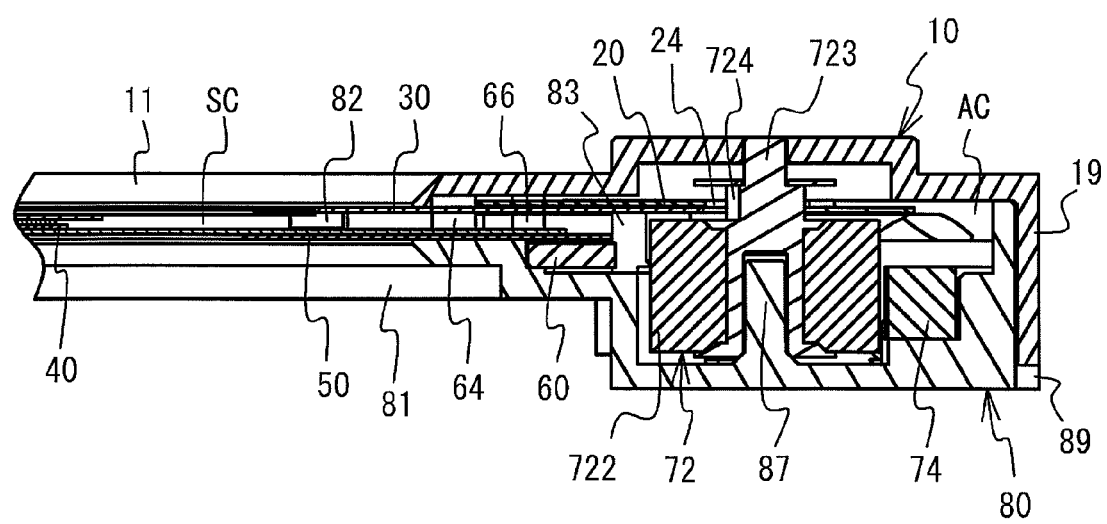
FIG. 4 is a cross-sectional view partially illustrating the assembled diaphragm device according to the embodiment.

FIGS. 2 and 3 are front views of an internal structure of the diaphragm device which has been assembled. In FIGS. 2 and 3, the shutter board 10, and the thin plates 30 and 50 are omitted. However, the opening 51 of the thin plate 50 is indicated by a broken line. Additionally, FIG. 2 illustrates a fully opened state where the blades 40 recede from the opening 51. FIG. 3 illustrates a small aperture state where the blades 40 reach the opening 51. FIG. 4 is a cross-sectional view partially illustrating the assembled diaphragm device.

As illustrated in FIGS. 1 and 4, the shutter board 80 is formed with a motor chamber AC for housing the step motor 70. Further, a blade chamber SC for housing the plural blades 40 is formed between the shutter board 10 and the shutter board 80. The motor chamber AC projects toward the image-forming side from the blade chamber SC in the optical axis direction, and is formed in a recess portion shape. The step motor 70 includes a rotor 72, a stator 74, coils 76 or the like as illustrated in FIGS. 2 to 4.

The rotor 72 includes: a cylindrical portion 722 which is formed in a cylindrical shape and which is magnetized to have different magnetic polarities in its circumferential direction; and a rotary shaft portion 723 which is integrally formed with the cylindrical portion 722. The cylindrical portion 722 and the rotary shaft portion 723 are integrally formed by insert molding. The cylindrical portion 722 is made of a magnet resin. The rotary shaft portion 723 is made of a synthetic resin with good slidability. For example, the rotary shaft portion 723 is made of a polyacetal resin. Further, a support spindle 87 is provided to stand within the motor chamber AC of the shutter board 80. The rotary shaft portion 723 is slidably and rotatably supported by the support spindle 87. This supports the rotor 72 for rotation.

Additionally, fixed spindles 82 are arranged at the inner side of the drive ring 60, as illustrated in FIGS. 2 and 3. This reduces the size of the shutter board 80 in its planer direction. Further, referring now to FIG. 2, plural cutouts 84 are formed at the periphery of the shutter board 80. The cutouts 84 are formed for avoiding the interference of the blades 40 in the fully opened state. This reduces the size of the shutter board 80.

Referring to FIGS. 2 to 4, the stator 74 is laterally U-shaped when viewed from its front side, and has both arms around which the coils 76 are respectively wound. The coils 76 are connected to a flexible printed substrate, not illustrated, for energization. The stator 74 is excited by the state where the coils 76 are energized. By the magnetically attractive force and repulsive force generated between the excited stator 74 and the rotor 72, the rotor 72 is rotated by a given amount.

Further, as illustrated in FIGS. 2 to 4, the rotary shaft portion 723 is integrally formed with a teeth portion 724 forming a rotor pinion portion. By the rotation of the rotor 72, the teeth portion 724 is rotated with the drive force of the step motor 70. Additionally, the thin plate 30 is formed with an escape hole 37 which permits the rotation of the rotary shaft portion 723, as illustrated in FIG. 1. The teeth portion 724 meshes and engages a driven teeth portion 24 formed in the transmitting member 20. The transmitting member 20 is formed with a spindle hole 23 at its substantial center, as illustrated in FIG. 1. Referring now to FIGS. 1 to 3, by engaging a support spindle 83 formed in the shutter board 80 with the spindle hole 23, the transmitting member 20 is rotatably supported. Also, the transmitting member 20 is formed with a cam slot 26. Here, the transmitting member 20 is formed into a sheet shape thinner than a thickness of the teeth portion 724 in the optical axis direction, that is, than a face width of the teeth portion 724. Specifically, the thickness of the transmitting member 20 is set from about 0.03 mm to about 0.15 mm, preferably, from 0.05 mm to 0.10 mm. Here, the material of the sheet shape may be flexible or non-flexible. For example, the material may be a polyacetal resin, a polyethylene terephthalate resin, or a metal, each of which is not flexible. In the present embodiment, the transmitting member 20 is made of a sheet shaped member with flexibility. The driven teeth portion 24 is formed in a range of a substantially half of the periphery of the transmitting member 20. The cam slot 26 is circular arc shaped with the spindle hole 23 used as a center. That is to say, the cam slot 26 is formed between the driven teeth portion 24 and the rotation center of the transmitting member 20.

When the teeth portion 724 rotates, the transmitting member 20 is rotated by the engagement of the teeth portion 724 with the driven teeth portion 24. The rotation of the transmitting member 20 enables a driven pin 66 (engagement pin) engaging the cam slot 26 to rotate around the optical axis. The driven pin 66 is provided to stand on the drive ring 60. When the transmitting member 20 rotates clockwise from the fully opened state illustrated in FIG. 2, the driven pin 66 revolves counterclockwise about the optical axis. That is, the drive ring 60 rotates counterclockwise.

Also, the drive ring 60 is formed with drive pins 64 corresponding to the number of the blades 40. The drive pins 64 are formed on the drive ring 60 at substantially even intervals. The drive pins 64 engage cam slots 44 formed in the blades 40, respectively. Additionally, a spindle hole 42 is formed in the blade 40, as illustrated in FIG. 1, and engages the fixed spindle 82 formed in the shutter board 80. Accordingly, the blades 40 are supported for swinging about the fixed spindles 82, respectively.

In addition, referring now to FIG. 1, the shutter board 10, and the thin plates 30 and 50 are respectively formed with escape holes 14, 34, and 54, which are provided for permitting the movements of the drive pins 64. The shutter board 10 and the thin plate 30 are respectively formed with escape holes 16 and 36, which are provided for permitting the movement of the driven pin 66. The escape hole 36 has an L shape, as illustrated in FIG. 1. The thin plates 30 and 50 are respectively formed with escape holes 32 and 52 into which the fixed spindles 82 are inserted. Further, engagement pawls 19 are formed at the periphery of the shutter board 10, and engagement portions 89 which respectively engage the engagement pawls 19 are formed at the periphery of the shutter board 80. By the engagement of the engagement pawls 19 with the engagement portions 89, the diaphragm device 1 is assembled.

When the drive ring 60 rotates counterclockwise from the fully opened state, the drive pins 64 move counterclockwise around the optical axis. In response thereto, the blades 40 swing about the fixed spindles 82 toward the center of the opening 51. In this way, the aperture of the opening 51 is adjusted. Also, by controlling the rotational position of the step motor 70, the aperture of the opening 51 can be continuously adjusted.

In addition, as mentioned above, each of the openings 31 and 51 is smaller than each of the openings 11 and 81. Further, the openings 11 and 81 have a substantially identical diameter, and the openings 31 and 51 also have a substantially identical diameter. Thus, the amount of light is defined by the openings 31 and 51 in the fully opened state.

In the fully opened state illustrated in FIG. 2, the driven pin 66 comes into contact with one end of the cam slot 26, and the plural drive pins 64 come into contact with one ends of the escape holes 14, 34, and 54. In the small aperture state illustrated in FIG. 3, the driven pin 66 comes into contact with the other end of the cam slot 26, and the plural drive pins 64 come into contact with the other ends of the escape holes 14, 34, and 54. As mentioned above, the movements of the blades 40 are limited between the fully opened state illustrated in FIG. 2 and the small aperture state illustrated in FIG. 3. In this manner, members come into contact with each other at plural points, thereby preventing concentration of load on a given part.

As described above, the drive force from the step motor 70 is transmitted to the drive ring 60 via the single transmitting member 20. In this way, the drive force from the step motor 70 is transmitted to the drive ring 60 by the single transmitting member 20, thereby reducing the number of the parts. A conventional diaphragm device transmits the drive force from an actuator to a drive ring via plural gears. However, the drive force is transmitted by the single transmitting member 20 in the diaphragm device according to the present embodiment. In this way, only the teeth portion 724 and the driven teeth portion 24 are meshed with each other, thereby reducing the operational noise. Further, the number of the parts is reduced, thereby reducing the manufacturing cost. Moreover, the number of the parts is reduced, thereby achieving a lightweight.

In addition, the cam slot 26 and the driven pin 66, which are respectively formed in the transmitting member 20 and the drive ring 60, engage each other, so the drive force from the step motor 70 is transmitted to the drive ring 60. Since the conventional diaphragm device employs plural decelerating gears, the impact sound is large. For this reason, it is difficult to reduce the operational noise. However, in the diaphragm device according to the present embodiment, the drive force is transmitted by the engagement of the cam slot 26 with the driven pin 66 without a gear. Accordingly the operational noise is reduced as compared to the conventional one.

Also, the transmitting member 20 has a thin sheet shape with flexibility. For this reason, the area in contact with the teeth portion 724 and the driven teeth portion 24 is small and the transmitting member 20 is also bendable. Therefore, when the teeth portion 724 and the driven teeth portion 24 mesh each other, the impact generated by engaging the cam slot 26 with the driven pin 66 is absorbed. In this way, the operational noise of the diaphragm device 1 is reduced as compared to the conventional diaphragm device. Further, the speed reducing mechanism 90 is provided between the shutter boards 10 and 80, thereby reducing the thickness of the diaphragm device 1 in the optical axis direction.

Since the operation noise is reduced in this way, for example, when the diaphragm device according to the present embodiment is employed in a camera having a movie recording function, the possibility of recoding the operational noise of the diaphragm device is avoidable during the time of movie recording. Moreover, the number of the parts is reduced, thereby achieving a lightweight, for example, when the diaphragm device according to the present embodiment is employed in an electronic portable device. This also improves the impact resistance.

Further, the transmitting member 20 has the thin sheet shape. Thus, unlike the conventional one, the diaphragm device is reduced in thickness by the configuration without a decelerating gear overlapped on the drive ring in the optical axis direction. Herein, the decelerating gear employed in the conventional diaphragm device can be shaped to be thin. The decelerating gear employed in the conventional diaphragm device has a large diameter teeth portion and a small diameter teeth portion which are arranged in the axial direction. Even if such a decelerating gear is shaped to be thin, the thickness of the large diameter teeth portion and that of the small diameter teeth portion will be needed.

Additionally, as illustrated in FIG. 4, the transmitting member 20, the blades 40, and the drive ring 60 are arranged in the thickness of the step motor 70 in the optical axis direction by employing the transmitting member 20 having the sheet shape. That is, the transmitting member 20, the blades 40, and the drive ring 60 can be arranged right beside the step motor 70. Moreover, the transmitting member 20 is thinner than the face width of the teeth portion 724. This also reduces the thickness of the diaphragm device in the optical axis direction.

Further, referring to FIGS. 2 and 3, at least a part of the transmitting member 20 overlaps the blades 40 and the drive ring 60 in the optical axis direction. This achieves the downsizing in the planar direction perpendicular to the optical axis. Furthermore, since the transmitting member 20 is formed into the sheet shape as mentioned above, even when at least a part of the transmitting member 20 overlaps the blades 40 and the drive ring 60 in the optical axis direction, the thin shape is maintained in the optical axis direction. Also, the reason why the transmitting member 20 and the drive ring 60 are arranged to overlap each other is that the drive force is transmitted to the transmitting member 20 and the drive ring 60 by engaging the cam slot 26 with the driven pin 66.

As described above, the diaphragm device according to the present embodiment is suitable for being employed in a small-sized electronic device such as a mobile phone.

In addition, since the transmitting member 20 is arranged to overlap the blades 40 and the drive ring 60 in the optical axis direction, the transmitting member 20 can be enlarged in the planar direction. This permits a pitch circle radius of the driven teeth portion 24 to be large. This also enlarges the speed reduction ratio between the rotor 72 and the transmitting member 20. The speed reduction ratio is enlarged, thereby decelerating the drive force of the step motor 70 and transmitting the drive force to the drive ring 60. Therefore, the positional accuracy of the blades 40 is improved. Consequently, the control accuracy of the aperture is improved.

As illustrated in FIGS. 2 to 4, the speed reducing mechanism 90 according to the embodiment also includes the drive ring 60 serving as a driven member and the transmitting member 20 transmitting the drive force from the step motor 70 to the drive ring 60. The drive ring 60 has the driven pin 66 serving as an engagement pin. Also, the transmitting member 20 has the driven teeth portion 24 which engages the teeth portion 724 defining the rotor pinion portion serving as the drive source from the step motor 70. Further, the transmitting member 20 is thinner than the face width of the teeth portion 724, and is formed into the sheet shape. Furthermore, the transmitting member 20 has the driven teeth portion 24, to which the drive force is transmitted from the step motor 70, and the cam slot 26, which engages the driven pin 66. The transmitting member 20 is rotatably supported by engaging the spindle hole 23 with the support spindle 83 formed on the shutter board 80.

With such a configuration of the speed reducing mechanism 90, the drive force is transmitted from the step motor 70 to the drive ring 60 by the single transmitting member 20, thereby reducing the number of the parts and the number of the meshing points. Thus, the operational noise is reduced. Further, the transmitting member 20 is formed into the sheet shape thinner than the face width of the teeth portion 724, thereby reducing the speed reducing mechanism 90 in thickness. Furthermore, the transmitting member 20 has flexibility, thereby absorbing the impact generated by the meshing of the teeth portion 724 with the driven teeth portion 24 or by the engagement of the cam slot 26 with the driven pin 66. This further reduces the operational noise. Moreover, the number of the parts is reduced, thereby maintaining a low manufacturing cost, and thereby achieving a lightweight.

Next, the configuration of the diaphragm device 1 will be briefly described again. The step motor 70 includes the teeth portion 724. The rotor 72 is capable of rotating and stopping at given step angle intervals. The transmitting member 20 includes the following teeth portion 24 meshing the teeth portion 724, and is capable of rotating and stopping in response to the drive force of the rotor 72. The drive ring 60 is capable of rotating and stopping in response to the drive force of the transmitting member 20. The blade 40 is capable of stopping at a receding position to recede from the opening 51 or at an aperture position to cover at least a part of the opening 51, in response to the drive force of the drive ring 60.

The blades 40 stop in response to the stop of the rotor 72. Thus, the aperture diameter of the opening 51 can be defined at several stages. FIG. 3 illustrates the diaphragm device 1 in the minimum aperture state where the aperture diameter of the opening is minimum. Each of the transmitting member 20, the drive ring 60, and the blade 40 has plural stoppable positions in the whole movable range. The interval between the adjacent stoppable positions of the blade 40 is smaller as the blade 40 is closer to the center of the opening 51.

Here, the cam slot 26 is formed such that a relationship between the rotational amount of the transmitting member 20 and the rotational amount of the drive ring 60 is nonlinear. This reason is as follows. In a case where two members rotationally interlocked with each other through teeth portions, the meshing point of the two members does not move. However, since the driven pin 66 is movable in the cam slot 26, a positional relationship between the driven pin 66 and the cam slot 26 is changed in response to the rotation of the transmitting member 20. Therefore, the positional relationship between the driven pin 66 and the cam slot 26 is changed in response to the rotation of the transmitting member 20, whereby the relationship between the rotational amount of the transmitting member 20 and the rotational amount of the drive ring 60 is nonlinear. Further, the cam slot 26 is shaped such that the relationship between the rotational amount of the transmitting member 20 and the rotational amount of the drive ring 60 is not linear.

The above configuration will be described in more detail. In the diaphragm device 1 according to the embodiment, the cam slot 26 is shaped to rotate the drive ring 60, so that an interval between the minimum aperture stop position of the drive ring 60 in the minimum aperture state and a stoppable position adjacent to the minimum aperture stop position is larger than an interval between adjacent stoppable positions of the drive ring 60 except in the minimum aperture state. Further, the cam slot 26 is shaped to rotate the drive ring 60, so that the interval between the stoppable positions of the drive ring 60 is larger as the drive ring 60 moves such that the blade 40 moves from the receding position toward the aperture position. Therefore, even in a case where intervals between the adjacent stoppable positions of the transmitting member 20 are constant, the cam slot 26 is shaped such that the intervals between adjacent stoppable positions of the drive ring 60 are changed.

As mentioned above, the rotational angle of the drive ring 60 relative to a given rotational angle of the transmitting member 20 changes with the positional relationship between the cam slot 26 and the driven pin 66. Thus, even in a case where the intervals between the adjacent stoppable positions of the transmitting member 20 are constant, the interval between the adjacent stoppable positions of the drive ring 60 changes with the positional relationship between the cam slot 26 and the driven pin 66. With this configuration, the interval between the stoppable positions of the drive ring 60 can be changed by modifying the shape of the cam slot 26. This eliminates the need to unnecessarily make the movable range of the drive ring 60 large so as to reduce the size of the cam slot 44 of the blade 40 engaging the drive pin 64 of the drive ring 60, thereby suppressing an increase in the size of the blade 40. Accordingly, the size of the diaphragm device 1 is reduced.

The interval between the minimum aperture stop position of the drive ring 60 in the minimum aperture state and the stoppable position adjacent to the minimum aperture stop position is set larger than the interval between the stoppable positions of the drive ring 60 except in the minimum aperture state.

The interval between the adjacent stoppable positions of the drive ring 60 is set as large as possible in the minimum aperture state where the aperture diameter of the opening 51 is minimum, thereby ensuring the positional accuracy of the blades 40 in the minimum aperture state. This is because the interval between the stoppable positions of the blade 40 is minimum as compared with the interval between the stoppable positions of the drive ring 60, in the minimum aperture state, and the stop position of the blade 40 is less influenced even when the drive ring 60 is misaligned from the original stop position in the minimum aperture state.

Further, the intervals between the adjacent stoppable positions of the drive ring 60 except in the minimum aperture state is set as small as possible, thereby reducing the whole size of the movable range of the drive pin 64 of the drive ring 60. This reduces the size of the cam slot 44 of the blade 40 engaging the drive pin 64 of the drive ring 60, and then the size of the blade 40 is suppressed from increasing. Accordingly, the size of the diaphragm device 1 is reduced.

Further, the interval between the stoppable positions of the drive ring 60 is larger as the blade 40 moves from the receding position toward the aperture position. When the drive ring 60 is misaligned from the original stop position, a misalignment amount relative to the interval between the stoppable positions is smaller as the interval between the stoppable positions of the drive ring 60 is larger. The intervals between the stoppable positions of the drive ring 60 is set to be larger as moving closer to the aperture position, whereby the relative misalignment amount of the drive ring 60 is smaller as moving closer to the aperture position. Therefore, the blades 40 are less influenced by the misalignment of the stop position of the drive ring 60 at the aperture position.

Furthermore, as illustrated in FIGS. 2 and 3, a distance D1 between the drive pin 64 and the fixed spindle 82 as the rotational center of the blade 40 is longer when the blade 40 is positioned at the aperture position than when the blade 40 is positions at the receding position. Since the distance D1 between the drive pin 64 and the fixed spindle 82 is longer when the blade 40 is positioned at the aperture position than when the blade 40 is positioned at the receding position, even when the stop position of the drive ring 60 is misaligned from the original position, a misalignment of the stop position of the blade 40 is less influenced. Therefore, the blades 40 are less influenced by the misalignment of the stop position of the drive ring 60 at the aperture position. Therefore, the aperture diameter of the opening 51 is finely reduced.

Further, the distance D1 is short when the blade 40 is positioned at the receding position as illustrated in FIG. 2, whereas the distance D1 is long when the blade 40 is positioned at the aperture position. Therefore, the movable amount of the blade 40 toward the receding position in response to the rotation of a given step angle of the step motor 70 is larger than the movable amount of the blade 40 toward the aperture position in response to the rotation of a given step angle of the step motor 70. In the diaphragm device 1, when the stop position of the drive ring 60 is misaligned from the original position, the movable amount of the blade 40 is larger at the receding position than at the aperture position. Herein, as illustrated in FIG. 2, the blade 40 at the receding position recedes from the opening 51 with an enough interval therebetween. Thus, the influence of the misalignment of the stop position of the drive ring 60 on the aperture accuracy is minimally suppressed.

As illustrated in FIGS. 2 and 3, the distance D2 between the driven pin 66 and the supporting spindle 83 as the rotational center of the transmitting member 20 is shorter when the blade 40 is positioned at the receding position than when the blade 40 is positioned at the aperture position. Since the movable amount of the blade toward the receding position is large as mentioned above, the load is applied to the drive ring 60 and the transmitting member 20 which are moving the blade 40 toward the receding position. However, the distance between the driven pin 66 and the supporting spindle 83 as the rotational center of the transmitting member 20 is short when the blade 40 is positioned at the receding position. The torque of the transmitting member 20 for driving the drive ring 60 is lower as the distance between the driven pin 66 and the rotational center of the transmitting member 20 is shorter. Therefore, the plural blades 40 are smoothly moved toward the recede positions.

Figure 5A:
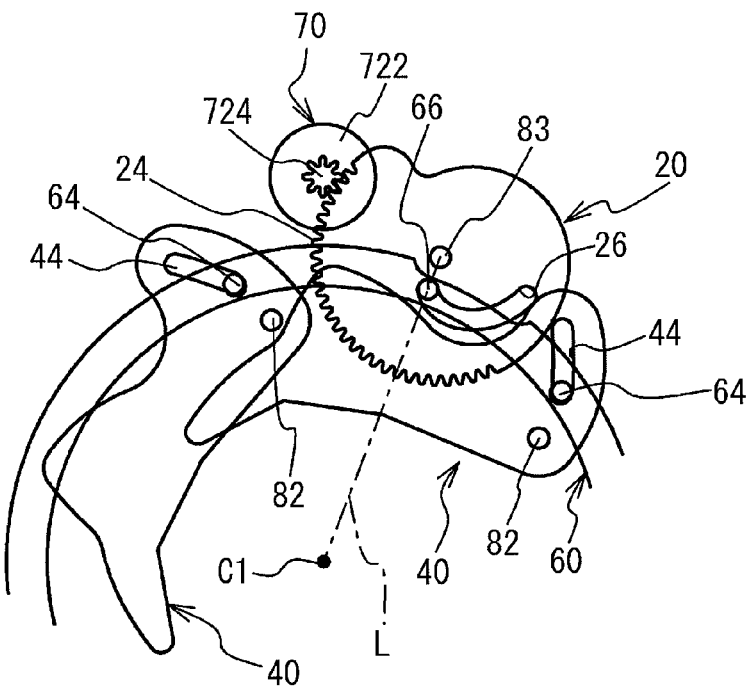
FIGS. 5A and 5B are explanatory views of the reciprocating movement of a driven pin in a cam slot.
Figure 5B:
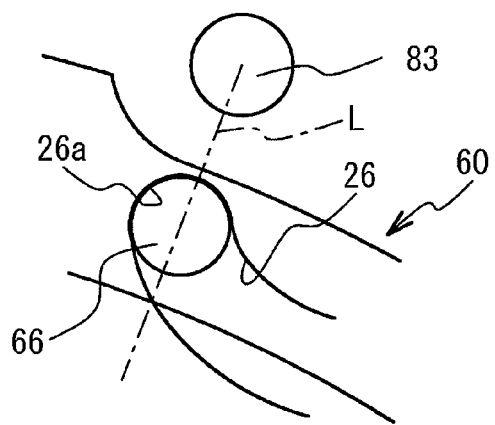
Figure 6A:
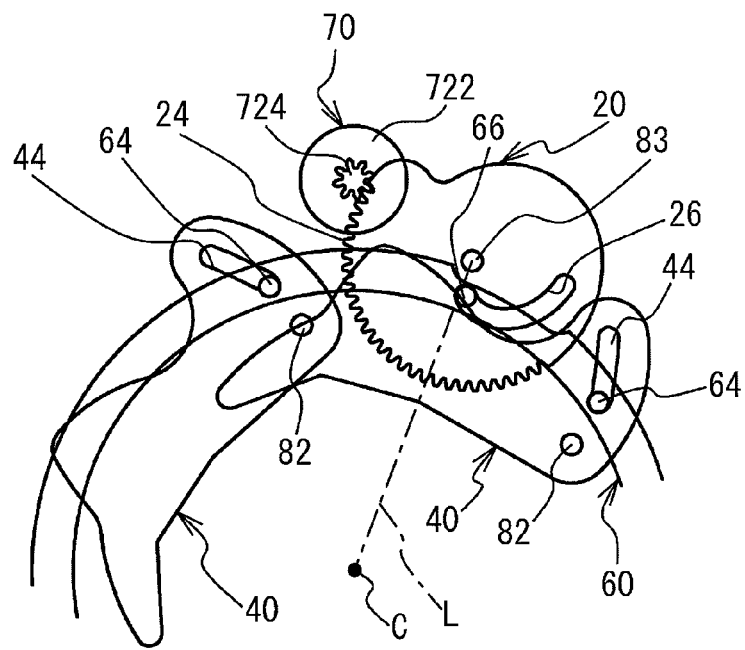
FIGS. 6A and 6B are explanatory views of the reciprocating movement of the driven pin in the cam slot.
Figure 6B:
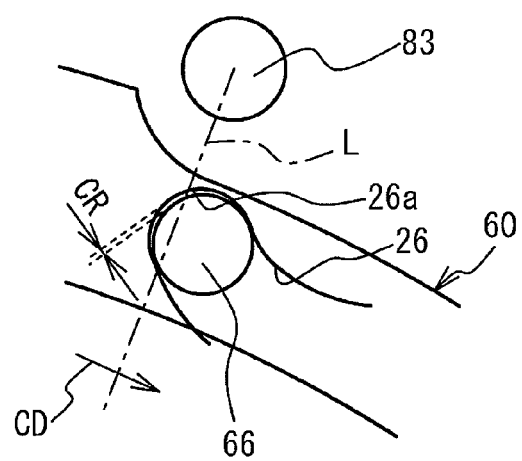

Next, the reciprocating movement of the driven pin 66 in the cam slot 26 will be described. FIGS. 5A, 5B, 6A, and 6B are explanatory views of the reciprocating movement of the driven pin 66 in the cam slot 26. FIGS. 5A and 5B illustrate the state where the driven pin 66 abuts one end of the cam slot 26. FIGS. 6A and 6B illustrate the state where the driven pin 66 is spaced apart from one end of the cam slot 26. FIGS. 5B and 6B are enlarged views around the driven pin 66 illustrated in FIGS. 5A and 6A, respectively.

FIGS. 6A and 6B illustrate the state where the blade 40 is maximally spaced apart from the center C of the opening 51. FIGS. 5A and 5B illustrate the state just before the blade 40 is maximally spaced apart from the center C of the opening 51. The transmitting member 20 moves counterclockwise from the state illustrated in FIGS. 5A and 5B, and then the drive ring 60 moves clockwise. Therefore, the state is shifted to the state illustrated in FIGS. 6A and 6B. That is, FIGS. 5A, 5B, 6A, and 6B illustrate the state where the blade 40 is in the process of moving from the aperture position toward the receding position.

As illustrated in FIGS. 5A and 5B, the driven pin 66 abuts one end of the opening 51 just before the blades 40 fully recede from the opening 51. Herein, L denotes phantom line connecting the center C of the opening 51 and the supporting spindle 83. As illustrated in FIG. 5B, the phantom line L passes through substantially the center of the driven pin 66 in this state. The rotor 72 further rotates from the states illustrated in FIGS. 5A and 5B, and then the transmitting member 20 rotates counterclockwise, whereby the drive ring 60 rotates in the clockwise direction CD as illustrated in FIG. 6B. As illustrated in FIG. 6B, the driven pin 66 rotates in the clockwise direction CD, and then the blade 40 is maximally spaced apart from the center C of the opening 51. At this time, the driven pin 66 moves away from one end 26a and toward the other end of the cam slot 26 by a distance CR.

In this away, while the drive ring 60 is rotating in the clockwise direction CD, the driven pin 66 moves toward one end 26a from the other end of the cam slot 26 so as to abut one end 26a, and then moves toward the other end again. The driven pin 66 reciprocates in a part of the cam slot 26, whereby the whole length of the cam slot 26 is suppressed from being made long. Therefore, the size of the transmitting member 20 is reduced. Accordingly, the whole size of the diaphragm device 1 is reduced.

While the preferred embodiments of the present invention have been illustrated in detail, the present invention is not limited to the above-mentioned embodiments, and other embodiments, variations and modifications may be made without departing from the scope of the present invention.

Finally, several aspects of the present invention are summarized as follows.

According to an aspect of the present invention, there is provided a diaphragm device including: a board including an opening; a step motor including a teeth portion, and rotatable and stoppable at an interval of a predetermined step angle; a transmitting member including a driven teeth portion meshing the teeth portion, and capable of rotating and stopping in response to a drive force of the teeth portion; a drive ring capable of rotating and stopping in response to a drive force of the transmitting member; and a blade capable of stopping at a receding position to recede from the opening or at an aperture position to cover at least a part of the opening, in response to a drive force of the drive ring, wherein the drive ring includes a drive pin engaging the blade, and a driven pin, the transmitting member includes a cam slot engaging the driven pin, and a relationship between a rotational amount of the transmitting member and a rotational amount of the drive ring is nonlinear.

Since the relationship between the rotational amount of the transmitting member and the rotational amount of the drive ring is nonlinear, even when the intervals between the stoppable positions of the transmitting member are constant, the interval between the stoppable positions of the drive ring changes with the positional relationship between the cam slot and the driven pin. Therefore, the desirable interval between the adjacent stoppable positions of the drive ring is made large on the basis of the aperture opening diameter, thereby ensuring the accuracy of the stop positions of the blade. Additionally, the interval is made small, thereby reducing the movable range of the drive pin of the drive ring without reducing the number of the stoppable positions. This reduces the size of the cam slot engaging the drive pin of the drive ring, thereby providing the diaphragm device with a reduced size of the blade.

In the above configuration, an interval between a minimum aperture stop position of the drive ring in a minimum aperture state where an aperture diameter of the opening is minimum and a stoppable position adjacent to the minimum aperture stop position, may be larger than an interval between adjacent stoppable positions of the drive ring except in the minimum aperture state.

The interval between the adjacent stoppable positions of the drive ring is set as large as possible in the minimum aperture state where the aperture diameter of the opening is minimum, thereby ensuring the positional accuracy of the blade in the minimum aperture state. Further, the intervals between the adjacent stoppable positions of the drive ring except in the minimum aperture state is set as small as possible, thereby reducing the whole size of the movable range of the drive pin of the drive ring. This reduces the size of the cam slot of the blade engaging the drive pin of the drive ring, and then reduces the size of the blade.

What is claimed is:

1. A diaphragm device comprising:
   a board including an opening;
   a step motor including a teeth portion, and rotatable and stoppable at an interval of a predetermined step angle;
   a transmitting member including a driven teeth portion meshing the teeth portion, and capable of rotating and stopping in response to a drive force of the teeth portion;
   a drive ring capable of rotating and stopping in response to a drive force of the transmitting member; and
   a blade capable of stopping at a receding position to recede from the opening or at an aperture position to cover at least a part of the opening, in response to a drive force of the drive ring,
   wherein the drive ring includes a drive pin engaging the blade, and a driven pin,
   wherein the drive pin and the driven pin are provided to stand on the same surface of the drive ring,
   wherein the transmitting member includes a cam slot engaging the driven pin,
   wherein a relationship between a rotational amount of the transmitting member and a rotational amount of the drive ring is nonlinear,
   wherein a first interval between a first stop position of the drive ring and a second stop position of the drive ring is larger than a second interval between a third stop position of the drive ring and a fourth stop position of the drive ring,
   wherein the first stop position of the drive ring is a minimum aperture stop position of the drive ring in a minimum aperture state where an aperture diameter of the opening is minimum,
   wherein the second stop position of the drive ring is adjacent to the first stop position of the drive ring,
   wherein the third stop position of the drive ring is adjacent to the fourth stop position of the drive ring, and
   wherein the third stop position of the drive ring and the fourth stop position of the drive ring are other than in the minimum aperture state.

2. The diaphragm device of claim 1, wherein the interval between adjacent stoppable positions of the drive ring is larger as the drive ring moves such that the blade moves from the receding position toward the aperture position.

3. The diaphragm device of claim 1, wherein a distance between the drive pin and a rotational center of the blade is longer when the blade is positioned at the aperture position than the distance when the blade is positioned at the receding position.

4. The diaphragm device of claim 3, wherein a distance between the driven pin and a rotational center of the transmitting member is shorter when the blade is positioned at the receding position than when the blade is positioned at the aperture position.

5. The diaphragm device of claim 1, wherein the driven pin reciprocates in a part of the cam slot while the drive ring is rotating in a given direction.

6. The diaphragm device of claim 5, wherein the driven pin reciprocates in the part of the cam slot while the drive ring is rotating such that the blade moves from the aperture position toward the receding position.

7. The diaphragm device of claim 5, wherein the driven pin abuts an end of the cam slot and then moves away from the end while the drive ring is rotating in the given direction.

8. The diaphragm device of claim 1, wherein the transmitting member is flexible.

* * * * *